United States Patent [19]

Sakuma et al.

[11] Patent Number: 4,810,733
[45] Date of Patent: Mar. 7, 1989

[54] COLOR CONCENTRATES

[75] Inventors: Noburu Sakuma, Sidney, Ohio; Hideo Shimizu, Saitama, Japan

[73] Assignee: Toyo Ink Mfg Co., Ltd, Tokyo, Japan

[21] Appl. No.: 110,137

[22] Filed: Oct. 19, 1987

[51] Int. Cl.$^4$ .......................... C08J 3/20; C08K 3/00; C08K 5/20; C08K 9/04
[52] U.S. Cl. ................................. 523/206; 524/227; 524/228; 524/229; 524/231; 524/399; 524/400; 524/486; 524/503; 524/504; 524/583
[58] Field of Search ................. 523/227-229, 523/206, 207, 208, 209; 524/231, 486, 399, 400, 503, 504, 583

[56] References Cited

U.S. PATENT DOCUMENTS

| | | | |
|---|---|---|---|
| 3,767,444 | 10/1973 | Zeisberger | 524/583 |
| 4,235,641 | 11/1980 | Engelmann et al. | 524/489 |
| 4,732,570 | 3/1988 | Baumbartner et al. | 524/583 |

FOREIGN PATENT DOCUMENTS 6225 1/1984 Japan.

OTHER PUBLICATIONS

Derwent 87-24957/35 Toyo Ink J62167340 (7-87).
Derwent 86-207400/32 Mitsui J61138652 (6-86).
Derwent 85-167876/28 Dainichiseika J60096622 (5-85).
Derwent 84-071045/12 Carbon Paper J59024691 (2-84).
Derwent 83-720055/30 Toyoda Gosei J58102744 (6-83).
Derwent 85-181516/30 Toyo Ink J60110737 (6-85).
Derwent 80-871480/49 Finke K. J55135141 (10-80).
Derwent Abs 77-74278y/42 Fabere DE2613933 (10-77).

Primary Examiner—Herbert J. Lilling
Attorney, Agent, or Firm—Bucknam and Archer

[57] ABSTRACT

A color concentrate which comprises (a) one or more of polypropylene resins and propylene copolymers having a melt flow rate in the range of 0.1–100, (b) one or more of organic and inorganic pigments; and (c) one or more pigment dispersants selected from the group consisting of polyethylene wax, polypropylene wax and derivatives thereof, zinc stearate, magnesium stearate, aluminium stearate, calcium stearate and ethylene bisamide, the contents of (a), (b) and (c) being, respectively, 11–30 wt %, 10–80 wt % and 10–50 wt % based on the total of (a), (b) and (c); and molded or extruded articles of thermoplastic resins other than (a) colored with the color concentrate.

6 Claims, No Drawings

COLOR CONCENTRATES

BACKGROUND OF THE INVENTION

FIELD OF THE INVENTION

This invention relates to a general-purpose color concentrate for coloring molded or extruded articles of thermoplastic resins other than polypropylene and propylene copolymers.

DESCRIPTION OF THE INVENTION

Conventional colorants for thermoplastic resin molded or extruded articles, include powdery dry colorants composed of mixtures of pigments and dispersants, liquid or paste colorants obtained by dispersing pigments in normally liquid dispersants, and color concentrates in the form of pellets, flakes or beads in which pigments are dispersed in high concentrations in normally solid resins. These colorants are selectively used depending on their characteristics. In view of ease in handling and cleanness maintenance in working environments, color concentrates containing the same base resin as a thermoplastic resin to be colored are preferably used. The properties required for the color concentrate tend to include not only high contents of pigments and good dispersability thereof as required hitherto, but also small influences on the various physical properties, such as heat resistance and strength, of thermoplastic resins to be colored, and good resistance to drying. The term "good resistance to drying" used herein is intended to mean that when a thermoplastic resin, particularly, a hygroscopic thermoplastic resin, is colored by the use of a color concentrate, the thermoplastic resin and the color concentrate are mixed together and have to be dried in an oven or a hopper dryer about at 120° C. for 2 hours prior to molding or extruding of the mixture, whereupon the mixture of the thermoplastic resin and the color concentrate will not be melted or fused together.

For increasing a pigment content, ensuring good dispersability of pigment, and preventing the molded articles from being unevenly colored, Japanese Patent Application Laid-Open Gazette No. 59-6225 proposes that a color concentrate used should have a lowered melt viscosity and, more particularly, the base resin of the color concentrate comprising the three essential ingredients (pigment, dispersant and base resin) should be lower in melt viscosity than the thermoplastic resin to be colored. However, the color concentrate so proposed is disadvantageous in that its mechanical strength and heat resistance are, per se, low so that it becomes difficult to produce the color concentrate and the various physical properties such as heat resistance, strength and the like of a thermoplastic resin to be colored will be lower and the "resistance to drying" will also be remarkably deteriorated by the use of the thus proposed color concentrate for the coloring. In addition, the coloration of a thermoplastic resin which is not the same as the base resin of the color concentrate is difficult, thus the proposed color concentrate being not suitable for general purposes.

Moreover, when a thermoplastic resin to be colored is an engineering plastics having high heat resistance and a high softening point, color concentrates using therein such a resin as the base resin are poor in workability. If the base resin is hygroscopic, the color concentrates have to be dried prior to molding or extruding, this being very troublesome from the standpoint of the process.

SUMMARY OF THE INVENTION

The present invention provides a color concentrate for coloring thermoplastic resins other than polypropylene and propylene copolymers. The color concentrate so provided cn overcome the various drawbacks described above and has a number of advantages such as good productivity, a high pigment content, good pigment dispersability, little or no adverse influences on the physical properties, such as heat resistance and strength, of thermoplastic resins to be colored, low hygroscopicity and good resistance to drying. In addition, the color concentrate can widely be applied for the coloration of a diversity of thermoplastic resins and is very effective in coloring thermoplastic resin compositions having high contents of inorganic fillers and fiber reinforcing materials. The color concentrate ensures uniform coloration of injection molded articles which are difficult to color uniformly and is generally usable as such in coloring thermoplastic resins other than polypropylene resins and propylene copolymers.

The color concentrate of the present invention is one which is useful in the coloration of thermoplastic resins other than the following resin (a) and which comprises the following main ingredients (a), (b) and (c), the contents of (a), (b) and (c) being, respectively, 11–30 wt%, 10–80 wt% and 10–50 wt% based on the total of the following (a), (b) and (c):

(a) one or more of polpropylene resins and propylene copolymers having a melt flow rate (hereinafter abbreviated as MFR) in the range of 0.1–100;

(b) one or more of organic and inorganic pigments; and (c) one or more pigment dispersants selected from the group consisting of polyethylene wax, polypropylene wax, the derivatives thereof, zinc stearate, magnesium stearate, aluminium stearate, calcium stearate and ethylene bisamide.

DETAILED DESCRIPTION OF THE INVENTION

As the ingredient (a), one or more of polypropylene resins and propylene copolymers whose MFR is in the range of 0.1–100, preferably 10–50, are used, MFR used herein means a MRF value determined according to JIS K 7210. The propylene copolymers may be random copolymers, block copolymers or graft copolymers, or may be metal salts of carboxyl group-containing propylene copolymers. If the MFR of polypropylene and propylene copolymers is less than 0.1, the resultant color concentrate will become poor in compatibility with thermoplastic resins to be colored. As a result, failure in dispersion of a pigments used or uneven coloration will take place, accompanied with adverse influences on the physical properties of the colored thermoplastic resin. On the other hand, when the MFR exceeds 100, the resulting color concentrate will exhibit low mechanical strength and heat resistance, thus making the preparation of a color concentrate difficult. In addition, the physical properties, such as heat resistance and strength, of colored thermoplastic resins will be adversely influenced by the use of the color concentrate having such a high MRR. The polypropylene and propylene copolymers may be in the form of powder or pellets, of which the powder is preferred for the production of a uniform color concentrate within a short time.

The organic and inorganic pigments used as the ingredient (b) in the present invention may be any known pigments used for the coloration of thermoplastic resins. Examples of such pigments include organic pigments such as azo, anthraquinone, phthalocyanine, quinacridone, isoindolenone, dioxane, perillene, quinophthalone and perinone pigments, as well as inorganic pigments such as cadmium sulfide, cadmium selenide, ultramarine, titanium dioxide, iron oxide, chromium oxide, lead oxide and carbon black.

The pigment dispersants (c) used in the invention include polyethylene wax, polypropylene wax and derivatives thereof such as acid-modified products and metal salts of the acid-modified products, as well as zinc stearate, magnesium stearate, aluminium stearate, calcium stearate and ethylene bisamide. These dispersants may be used singly or jointly. The polypropylene wax and its derivatives used as the pigment dispersant have a molecular weight of approximately 2000–15000, and their MFR is much larger than 100, so that it is ordinarily not measured.

The color concentrate for the coloration of thermoplastic resins other than the resin (a) is comprised mainly of the above ingredients (a), (b) and (c) and is characterized in that it contains the ingredients (a), (b) and (c) in amounts of 11–30 wt%, 10–80 wt% and 10–50 wt%, respectively, based on the total of the ingredients (a), (b) and (c).

If the amount of (a) used is less than 11 Lwt% in such a case as above, the preparation of a color concentrate using an extruder having a screw diameter of 40 mm or over will be difficult because a strand breakage and a pulsating flow take place resulting in producing pellets in the undesirable form with considerable poor productivity. In addition, when the amount of (a) is less than 5 wt%, not only the mechanical strength and the heat resistance, during heating and drying procedures, of the resulting color concentrate will be low, but also the preparation of the color concentrate itself will be difficult. WIth the use of the ingredient (a) in an amount of over 30 wt%, adverse influences will be produced on the mechanical properties, such as strength and heat resistance, of thermoplastic resins to be colored.

When the amount of (b) used is less than 10 wt%, the concentration of the pigment in the resulting color concentrate will become so small that satisfactory coloration cannot be expected. If the amount of the resulting color concentrate is used in an increased amount in order to ensure a high degree of coloration, the cost for the coloration will become high, and the mechanical properties, such as strength and heat resistance, of thermoplastic resins to be colored will be adversely influenced, resulting in the lowering of general-purpose properties. On the other hand, when the amount of (b) exceeds 80 wt%, the fluidity will lower, making the production of a color concentrate difficult.

When the amount of (c) is less than 10 wt%, the dispersion of the pigment (b) becomes difficult and the resulting molded or extruded articles will tend to suffer uneven coloration. When the amount of (c) exceeds 50 wt%, not only the heat resistance of the resulting color concentrate during thermal drying will deteriorate, but also the mechanical properties, such as strength and heat resistance, of thermoplastic resins to be colored will be adversely influenced.

The color concentrate according to the invention may further comprise stabilizers such as antioxidants and UV absorbers, as well as various additives such as surface active agents, each in small amounts not impeding the effect of the invention.

The thermoplastic resins other than (a), which are used for coloration with the color concentrate of the invention include high density polyethylene, low density polyethylene, ethylene-vinyl acetate copolymer resins, ethylene-(meth)acrylic acid copolymer resins, polymethylpentene, polybutene-1, polystyrene, polyvinyl chloride, polyethylene terephthalate, polybutylene terephthalate, acrylonitrile-butadiene-styrene copolymer (ABS) resins, acrylonitrile-EPDM-styrene copolymer (AES) resins, polyamides, polycarbonates and polyacetals. The thermoplastic resins may comprise up to 70 parts by weight of inorganic fillers such as talc, mica, barium sulfate, calcium carbonate and calcium silicate, and reinforcing materials such as glass fibers, organic fibers, metallic fibers and carbon fibers, per 100 parts by weight of the resin.

The color concentrate according to the invention is added in an amount not larger than 10 parts by weight, preferably from 1 to 5 parts by weight, to 100 parts by weight of a thermoplastic resin other than the resin ingredient (a) to color the former resin, after which the resulting colored mixture is molded or extruded.

The present invention will be better understood by the following examples in which all parts are by weight unless otherwise specified.

EXAMPLE 1

| | |
|---|---|
| Polypropylene (Mitsui PP Hypol J440, available from Mitsui Petrochemical Industries, Ltd., MFR 5.0) | 15 wt % |
| Titanium oxide (Tipaque CR-50, available from Ishihara Sangyo Kaisha, Ltd.) | 50 wt % |
| Carbon black (Mitsubishi Carbon Black MA-100, available from Mitsubishi Chemical Industries Ltd.) | 5 wt % |
| Polyethylene wax (AC Polyethylene 6A, available from Allied Corp.) | 30 wt % |

The above four ingredients were kneaded in a kneader and pelletized by the use of an extruder having a screw diameter of 90 mm to obtain a color concentrate without causing any strand breakage and any pulsating flow during the operations. 3 parts of the color concentrate was mixed with 100 parts of a polyethylene composition containing 30% of talc and having a MFR value of 5.0, after which the resulting mixture was dried at 120° C. for 2 hours. No fusion was found in the dried mixture of the color concentrate and polyethylene composition.

After drying, the mixture of the color concentrate and polyethylene composition was molded into plates by the use of an injection molding machine at a back pressure of 0 kg/cm$^2$.

The resultant molded articles were evaluated for their retentivity of mechanical properties (retentivity in this case meaning a ratio of mechanical properties of the resin colored with the color concentrate to mechanical properties (100%) of the original non-colored resin) and the evenness of coloration on the surface of the articles, with the results shown in Table 1.

COMPARATIVE EXAMPLE 1

The procedure of Example 1 was repeated except that low density polyethylene (Suntex LD F-2270, available from Asahi Chemical Industry Co., Ltd.) was used instead of the polypropylene, thus obtaining a color concentrate. The color concentrate could be obtained satisfactorily without causing any strand breakage and any pulsating flow during the operations. 3 parts of the thus obtained color concentrate was mixed with 100 parts of the same polyethylene composition as used in Example 1 and dried at 120° C. for 2 hours. Partial fusion was observed in the mixture of the color concentrate and the polyethylene composition after drying.

The mixture of the color concentrate and polyethylene composition, obtained after drying, was molded into plates in the same manner as in Example 1.

The thus obtained molded articles were evaluated for their retentivity of mechanical properties and the evenness of coloration, with the results shown in Table 1.

EXAMPLE 2

| | |
|---|---|
| Polypropylene (Idemitsu Polypro J-750H, available from Idemitsu Petrochemical Co., Ltd.) | 15 wt % |
| Isoindoline pigment (IRGAZIN Yellow 3RLTN, available from Ciba-Geigy Corp.) | 10 wt % |
| Tipaque CR-50 | 40 wt % |
| Polyethylene wax (SANWAX 165P, available from Sanyo Chemical Industries, Ltd.) | 20 wt % |
| Polypropylene wax (VISCOL 550P, available from Sanyo Chemical Industries, Ltd.) | 15 wt % |

The above five ingredients were kneaded in a kneader and pelletized by the use of an extrusion molding machine having a screw diameter of 90 mm to obtain a color concentrate. The color concentrate could be obtained satisfactorily without causing any strand breakage and any pulsating flow during the operations. 3 parts of the thus obtained color concentrate was mixed with 100 parts of polycarbonate (TOUGHLON A-2000, available from Idemitsu Petrochemical Co., Ltd.) and dried at 120° C. for 2 hours. The dried mixture of the color concentrate and polycarbonate was found to have caused no fusion.

The mixture of the color concentrate and polycarbonate, obtained after drying, was molded into plates in the same manner as in Example 1.

The resultant molded articles were evaluated for their retentivity of mechanical properties and the evenness of coloration, with the results shown in Table 1.

COMPARATIVE EXAMPLE 2-1

| | |
|---|---|
| "Idemitsu Polypro J-750H" | 10 wt % |
| "IRGAZIN Yellow 3RLTN" | 10 wt % |
| "Tipaque CR-50" | 40 wt % |
| "SANWAX 165P" | 20 wt % |
| "VISCOL 550P" | 20 wt % |

The above five ingredients were kneaded in a kneader and pelletized by the use of a small-size extruder having a screw diameter of 35 mm to obtain a color concentrate. Polycarbonate "TOUGHLON A-2200" and the thus obtained color concentrate were mixed in the same ratio as in Example 2 and dried at 120° C. for 2 hours. No fusion was observed in the dried mixture of the color concentrate and polycarbonate.

The dried mixture of the color concentrate and polycarbonate was molded into plates in the same manner as in Example 1.

The resultant molded articles were evaluated for their retentivity of mechanical properties and the evenness of coloration. The results are shown in Table 1.

It was attempted to pelletize the by the use of an extruder having a screw diameter of 90 mm in the same manner as in Example 2 in order to obtain a color concentrate, but a color concentrate could not be obtained continuously and smoothly in good pellet form because strand breakage and pulsating flows took place during the operations.

COMPARATIVE EXAMPLE 2-2

The procedure of Example 2 was repeated except that LLDPE resin (YUKALON M90MG, available from Mitsubishi Petrochemical Co., Ltd.) was used instead of the polypropylene, thus obtaining a color concentrate. The color concentrate could be satisfactorily obtained without causing any strand breakage and any pulsating flow during the operations. 3 parts of the color concentrate was mixed with 100 parts by weight of the same polycarbonate as used in Example 2 and dried at 120° C. for 2 hours. Fusion was observed in the dried mixture of the color concentrate and the polycarbonate obtained after drying.

The dried mixture of the polycarbonate and color concentrate was molded into plates in the same manner as in Example 2.

The resultant molded articles were evaluated for their retentivity of mechanical properties and evenness of coloration, with the results shown in Table 1.

EXAMPLE 3

| | |
|---|---|
| Polypropylene (Sumitomo Noblen AY-864, available from Sumitomo Chemical Co., Ltd.) | 15 wt % |
| Titanium oxide (TI-PURE R-101, available from E. I. Du Pont Nemours & Co.) | 20 wt % |
| Red iron oxide (TODA COLOR 180ED, available from Toda Kogyo Corp.) | 40 wt % |
| Ethylene bisamide (ALFLOW H50S, available from Nippon Oil and Fats Co., Ltd.) | 25 wt % |

The above four ingredients were kneaded in a kneader and pelletized by the use of an extruder having a screw diameter of 90 mm to obtain a color concentrate. The color concentrate could be obtained satisfactorily without causing any strand breakage and any pulsating flow during the operations. 3 parts of the color concentrate was mixed with 100 parts of ABS resin (KRALASTIC MH, available from Sumitomo Naugatuch Co., Ltd.) and dried at 80° C. for 3 hours. No fusion was observed in the dried mixture of the color concentrate and the ABS resin.

The dried mixture of the color concentrate and ABS resin was molded into plates in the same manner as in Example 1.

The resultant molded articles were evaluated for their retentivity of mechanical properties and evenness of coloration. The results are shown in Table 1.

COMPARATIVE EXAMPLE 3-1

| | |
|---|---|
| "Sumitomo Noblen AY-864" (polypropylene) | 10 wt % |
| "TI-PURE R-101" (titanium oxide) | 20 wt % |
| "TODA COLOR 180ED" (red iron oxide) | 40 wt % |
| "ALFLOW H50S" (ethylene bisamide) | 30 wt % |

The above four ingredients were kneaded in a kneader and pelletized by the use of a small-size extruder having a screw diameter of 35 mm to satisfactorily obtain a color concentrate. 3 parts of the thus obtained color concentrate was mixed with 100 parts of ABS resin ("KRALASTIC MH", available from Sumitomo Naugatuch Co., Ltd.) and dried at 80° C. for 2 hours. The dried mixture of the color concentrate and ABS resin was found to have caused no fusion.

The mixture of the color concentrate and ABS resin, obtained after drying, was molded into plates in the same manner as in Example 1.

The resultant molded articles were evaluated for their retentivity of mechanical properties and evenness of coloration, with the results shown in Table 1.

It was intended to obtain a color concentrate from the above four ingredients by pelletizing with the use of an extruder having a screw diameter of 90 mm in the same manner as in Example 3, but stand breakage and pulsation took place and thus, a color concentrate of good quality in the form of pellets could not be obtained continuously and smoothly.

COMPARATIVE EXAMPLE 3-2

| | |
|---|---|
| "Sumitomo Noblen AY-864" | 40 wt % |
| "TI-PURE R-101" | 13 wt % |
| "TODA COLOR 180ED" | 27 wt % |
| "ALFLOW H50S" | 20 wt % |

A color concentrate was obtained from the above four ingredients in the same manner as in Example 3. The color concentrate could be obtained satisfactorily without involving any strand breakage and any pulsating flow during the operations. To make the content of pigment in the resulting molded articles the same as that in Example 4, 4.57 parts of the color concentrate was mixed with 10 parts of the same ABS resin as used in Example 3 and dried at 80° C. for 3 hours. No fusion was observed in the dried mixture of the color concentrate and ABS resin.

The dried mixture of the color concentrate and ABS resin was molded into plates in the same manner as in Example 3.

The thus obtained molded articles were found to have surface peeling. The molded articles were evaluated for their retentivity of mechanical properties and evenness of coloration, with the results shown in Table 1.

TABLE 1

| | Rententivity of Mechanical Properties | | | | | Evenness of coloration of Molded Articles | Productivity of Color Concentrate |
|---|---|---|---|---|---|---|---|
| | Tensile Strength | Flexural Modulus of Elasticity | Bending Strength | Izod Impact | Thermal Deformation Temp. | | |
| Ex. 1 | o | o | o | o | o | o | o |
| Comp. Ex. 1 | o | x | o | o | Δ | Δ-x | o |
| Ex. 2 | o | o | o | o | o | o | o |
| Comp. Ex. 2-1 | o | o | o | o | o | o | x |
| Comp. Ex. 2-2 | o | x | Δ | o | x | o | o |
| Ex. 3 | o | o | o | o | o | o | o |
| Comp. Ex. 3-1 | o | o | o | o | o | o | x |
| Comp. Ex. 3-2 | x | x | Δ | Δ | x | Δ | o |

Rententivity of mechanical properties:
o: 96% or over
Δ: 90% to less than 96%
x: less than 90%
Evenness of coloration on the surface of molded articles (visual observation):
o: even coloration
Δ: somewhat uneven coloration
x: remarkably uneven coloration
Productivity of color concentrate (determined using an extruder having a screw diameter of 90 mm):
o: good
x: bad The new color concentrate of the present invention enables satisfactory coloration of a to-be-colored thermoplastic resin even if it is added thereto in a much smaller amount than conventional color concentrates because of its very high pigment content and good productivity, thus remarkably reducing the cost for the coloration. The new color concentrate, when added, will have no adverse effects on the strength, other mechanical properties, heat resistance and the like of the thermoplastic resin to be colored. Thus, the new color concentrate not only has wide utility in coloration of a diversity of thermoplastic resins, but also is effective in the coloration of thermoplastic resin compositions having high contents of inorganic fillers and fiber reinforcements, which compositions are difficult to uniformly color and whose importance is placed on their physical properties, such as mechanical properties, and heat resistance. In spite of the fact that the color concentrate for coloration of thermoplastic resins according to the invention has a high pigment content, the dispersability of the pigment is good, permitting uniform coloration of injection molded articles whose uniform coloration with known color concentrates has been considered difficult. Moreover, the color concentrate of the invention has low hygroscopicity and good resistance to drying.

What is claimed is:

1. A color concentrate for coloration of a thermoplastic resin which is high density polyethylene, low density polyethylene, ethylene-vinyl acetate copolymer resins, ethylene-(meth) acrylic acid copolymer resins, polymethylpentene, polybutene-1, polyststyrene, polyvinyl chloride, polyethylene terephthalate, polybutylene terephthalate, acrylonitrilebutadiene-styrene copolymer (ABS) resin acrylonitrile-EPDM-styrene (AES) resins, polyamides, polycarbonates, or polyacetals, which comprises the following ingredients (a), (b) and (c) in the respective amounts of 11-30 wt%, 10-80 wt% and 10-50 wt% based on the total of (a), (b) and (c):
(a) at least one ingredient selected from the group consisting of polypropylene resins and propylene copolymers having a melt flow rate in the range of 0.1-100;
(b) at least one pigment selected from the group consisting of organic and inorganic pigments; and
(c) at least one pigment dispersant selected from the group consisting of polyethylene wax, polypropylene wax and derivatives thereof, zinc stearate, magnesium stearate, aluminium stearate, calcium stearate and ethylene bisamide.

2. A color concentrate according to claim 1, wherein the ingredient (a) is at least one of the polypropylene resins.

3. A color concentrate according to claim 1, wherein the ingredient (a) has a melt flow rate of 10 to 50.

4. A color concentrate according to claim 1, wherein the ingredient (c) is a member selected from the group consisting of polyethylene wax, polypropylene wax, derivatives of the waxes, and ethylene bisamide.

5. A molded or extruded article of a thermoplastic resin which is high density polyethylene, low density polyethylene, ethylene-vinyl acetate copolymer resins, ethylene-(meth) acrylic acid copolymer resins, polymethylpentene, polybutene-1, polystyrene, polyvinyl chloride, polyethylene terephthalate, polybutylene terephthalate, acrylonitrile-butadiene-styrene copolymer (ABS) resins, acrylonitrile-EPDM-styrene (AES) resins, polyamides, polycarbonates or polyacetals, which is colored with a color concentrate comprising the following ingredients (a), (b) and (c) in the respective amounts of 11 to 30 wt%, 10 to 80 wt% and 10 to 50 wt% based on the total of the ingredients (a), (b) and (c):
(a) at least one ingredient selected from the group consisting of polypropylene resins and propylene copolymers having a melt flow rate in the range of 0.1-100;
(b) at least one pigment selected from the group consisting of organic and inorganic pigments; and
(c) at least one pigment dispersant selected from the group consisting of polyethylene wax, polypropylene wax, derivatives of the waxes, zinc stearate, magnesium stearate, aluminum stearate, calcium stearate and ethylene bisamide.

6. A molded or extruded article according to claim 5, wherein the color concentrate is added in an amount of not higher than 10 parts by weight per 100 parts by weight of the thermoplastic resin other than (a).

* * * * *